United States Patent
Mizoguchi

(10) Patent No.: US 12,168,731 B2
(45) Date of Patent: Dec. 17, 2024

(54) MARKING INK COMPOSITION FOR WRITING BOARD

(71) Applicant: MITSUBISHI PENCIL COMPANY, LIMITED, Tokyo (JP)

(72) Inventor: Tatsuya Mizoguchi, Shinagawa-ku (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 976 days.

(21) Appl. No.: 17/115,977

(22) Filed: Dec. 9, 2020

(65) Prior Publication Data

US 2021/0179872 A1    Jun. 17, 2021

(30) Foreign Application Priority Data

Dec. 11, 2019   (JP) .................. 2019-223951

(51) Int. Cl.
| | |
|---|---|
| *C09K 3/22* | (2006.01) |
| *C08K 3/08* | (2006.01) |
| *C08K 3/22* | (2006.01) |
| *C08L 25/14* | (2006.01) |
| *C08L 29/04* | (2006.01) |
| *C09D 11/17* | (2014.01) |

(52) U.S. Cl.
CPC .............. *C09D 11/17* (2013.01); *C08K 3/08* (2013.01); *C08K 3/22* (2013.01); *C08L 25/14* (2013.01); *C08L 29/04* (2013.01); *C08K 2003/0812* (2013.01); *C08K 2003/2237* (2013.01)

(58) Field of Classification Search
CPC .......... C09D 11/17; C09D 11/16; C08K 3/08; C08K 3/22; C08K 2003/0812; C08K 2003/2237; C08L 25/14; C08L 29/04
See application file for complete search history.

(56) References Cited

U.S. PATENT DOCUMENTS

| | | | | |
|---|---|---|---|---|
| 5,716,217 A | * | 2/1998 | Imagawa ............... | C09D 11/16 524/475 |
| 7,500,743 B2 | * | 3/2009 | Takashima ........... | B41M 7/0054 347/100 |
| 2004/0147632 A1 | * | 7/2004 | Nakamura ............. | C09D 11/16 106/31.86 |

FOREIGN PATENT DOCUMENTS

| | | | |
|---|---|---|---|
| EP | 2891691 | * | 8/2013 |
| EP | 2 891 691 A1 | | 7/2015 |
| JP | H 1025443 | * | 12/1996 |
| JP | 10-25443 A | | 1/1998 |
| JP | 2003292865 A | * | 10/2003 |
| JP | 2003-313484 A | | 11/2003 |

OTHER PUBLICATIONS

Extended European Search Report issued Apr. 14, 2021 in European Patent Application No. 20213182.7, 6 pages.

* cited by examiner

*Primary Examiner* — Kumar R Bhushan
(74) *Attorney, Agent, or Firm* — Oblon, McClelland, Maier & Neustadt, L.L.P.

(57) ABSTRACT

To provide a marking ink composition for a writing board having excellent erasability of drawn lines, the marking ink composition essentially containing a pigment, a pigment dispersant resin, a masking agent, and a modified polyvinylalcohol or a polyvinylalcohol having a degree of saponification from 40 to 84% by molar ratio.

20 Claims, No Drawings

MARKING INK COMPOSITION FOR WRITING BOARD

This Nonprovisional application claims priority under 35 U.S.C. § 119 (a) on Patent Application No. 2019-223951 filed in Japan on 11 Dec. 2019, the entire contents of which are hereby incorporated by reference.

FIELD OF THE INVENTION

The present invention relates to a marking ink composition for a writing board suitable for writing boards, such as whiteboards and blackboards. More specifically, the present invention relates to a marking ink composition for a writing board, the marking ink composition having excellent erasability of drawn lines.

BACKGROUND ART

Letters and the like written on a writing board by a marking ink for writing have to be able to be easily wiped off by, for example, an eraser and have to be reliably erased.

In the related art, as marking ink compositions for writing boards, for example, 1) an aqueous ink composition for a writing board containing at least a pigment, an extender pigment, an acrylic resin, a polyvinylalcohol or water soluble cellulose derivative, a polyethylene glycol, and water, disclosed in, for example, Japanese Patent Application Laid-Open No. 2003-292865 and the claims and examples thereof, and 2) an aqueous ink composition for a writing board containing at least a pigment, an extender pigment, an acrylic resin, a polyvinylalcohol or water soluble cellulose derivative, a polyethylene glycol that has a molecular weight from 600 to 6000 and that is a paste or solid at room temperature, an aliphatic carboxylate, and water, disclosed in, for example, Japanese Patent Application Laid-Open No. 2003-313484 and the claims and examples thereof have been known.

However, such a marking ink composition for a writing board has problems of reduction in erasability due to a pigment attaching to a written surface depending on the type of the used pigment, for example. Furthermore, it is often difficult to easily and completely wipe off depending on a material or the like of a writing board and problems, in which the letters and the like remain on the writing board, may occur. Furthermore, the two Patent Documents described above are close to the present invention in terms of use of polyvinylalcohol; however, use of polyvinylalcohol in the documents is to function as a pigment dispersant, and the technological concept in objects of the inventions, problems, configurations, and effects thereof are different from those of the present invention.

SUMMARY OF THE INVENTION

In light of problems of known art described above, the present invention is to solve the problems, and an object of the present invention is to provide a marking ink composition for a writing board, the marking ink composition having excellent erasability of drawn lines.

In light of known problems described above, as a result of diligent research, it was found that the target marking ink composition for a writing board described above can be obtained by allowing a pigment, a pigment dispersant resin, a masking agent, an erasing auxiliary, and a polyvinylalcohol having particular physical properties to be essentially contained, and the present invention has been thus completed.

That is, the marking ink composition for a writing board of the present invention essentially contains a pigment, a pigment dispersant resin, a masking agent, and a modified polyvinylalcohol or a polyvinylalcohol having a degree of saponification from 40 to 84% by molar ratio.

The pigment dispersant resin is preferably at least one selected from the group consisting of styrene-acrylate resins and styrene-maleate resins.

Effect of the Invention

According to the present invention, a marking ink composition for a writing board, the marking ink composition having excellent erasability of drawn lines, is provided. Furthermore, when a styrene-acrylate resin or a styrene-maleate resin is used as the pigment dispersant resin, superior color development of drawn lines is achieved.

DETAILED DESCRIPTION OF THE PREFERRED EMBODIMENTS

An embodiment of the present invention is described below in detail.

The marking ink composition for a writing board of the present invention essentially contains a pigment, a pigment dispersant resin, a masking agent, and a modified polyvinylalcohol or a polyvinylalcohol having a degree of saponification of 40 to 84 mol %. Note that, when the range is "xx to yy", the range includes the lower limit value xx and the upper limit value yy unless otherwise noted.

The pigment used in the present disclosure is not particularly limited as long as the pigment is used for the marking ink composition for a writing board. Examples thereof include at least one pigment such as azo pigments, condensed polyazo pigments, phthalocyanine pigments, metal complex salt pigments, thioindigo pigments, carbon black, Prussian blue, red iron oxide, dye lake pigments, and fluorescent pigments, each alone or a plurality of pigments mixed, hereinafter the same. Furthermore, processed pigments in which the surface has been processed with a resin coating, such as various Microlith A type such as AS black, AS blue, and IK red, can be used.

The content of the pigments is preferably 1 to 10% by mass, and more preferably 2 to 8% by mass, based on the total amount of the ink composition. Note that, hereinafter, "% by mass" is simply referred to as "%". Furthermore, together with the pigments described above, water-soluble dyes, such as acidic dyes and basic dyes, can be used in a range that does not impair the effects of the present invention.

The content of the pigment less than 1% is not preferred because the intensity of drawn lines becomes insufficient. On the other hand, the content of the pigment greater than 10% is not preferred because writability may be poor and erasability may be poor.

The pigment dispersant resin used in the present disclosure is used as a dispersant of the pigment described above. The pigment dispersant resin is not particularly limited as long as the pigment dispersant resin is a pigment dispersant resin used for the marking ink composition for a writing board. From the perspective of excellent color development of drawn lines, use of a styrene-acrylate resin or a styrene-maleate resin is preferred.

For commercially available products, examples of the styrene-acrylate resin that can be used include at least one of Joncryl 52J, Joncryl 57J, Joncryl 60J, and Joncryl 63J manufactured by BASF Japan Ltd., and RS-1191, VS-1047, and YS-1274 manufactured by Seiko PMC Corporation, and examples of the styrene-maleate resin include ARASTAR 700 and ARASTAR 703S manufactured by Arakawa Chemical Industries, Ltd., and SMA-1440, SMA-2625, and SMA-17352 manufactured by Kawahara Petrochemical Co., Ltd.

From the perspectives of, for example, handling during production and stability over time of the ink composition, use of a styrene-acrylate resin is preferred.

The content of the pigment dispersant resins, in terms of solid content concentration, is 0.2 to 10%, and preferably 0.3 to 4%, based on the total amount of the ink composition.

The content of the pigment dispersant resins less than 0.2% is not preferred because the ink composition becomes unstable over time. On the other hand, the content of the pigment dispersant resins greater than 10% is not preferred because the viscosity of the ink composition is increased, for example.

The masking agent used in the present disclosure is not particularly limited as long as the masking agent is particles exhibiting masking properties. Examples thereof include at least one selected from the group consisting of aluminum pigments, titanium oxides, zinc oxides, hollow resin particles, and anisotropic resin particles. Particles thereof may be masking particles in which the particle surfaces are surface-treated with organic titanate or the like.

From the perspective of exhibiting clear handwriting with high masking properties, as the used masking particles, use of titanium oxide alone and combined use of titanium oxide, hollow resin particles, anisotropic resin particles, and the like are preferred.

Furthermore, the used masking particles preferably have an average particle size from 0.05 to 20 µm, and particularly preferably has an average particle size from 0.1 to 10 µm.

Furthermore, in the case where a non-absorbing surface of the writing target is white or a pale color such as yellow, a black pigment can be used as a masking agent.

Specific examples thereof include pigments such as carbon black, spherical graphite particles, black iron oxide, and black spherical resin particle pigments. Examples of the carbon black that can be used include channel black, furnace black, acetylene black, and thermal black.

The content of the black pigments is 0.1 to 35%, more preferably 0.1 to 20%, and even more preferably 1 to 15%, based on the total amount of the ink composition.

Furthermore, the particles of carbon black to be used preferably have an average particle size from 0.05 to 1 µm, and particularly preferably have an average particle size from 0.05 to 0.5 µm. Here, the average particle size is defined as a $D_{50}$ value based on the volume determined using a particle analyzer, HRA9320-X100 manufactured by Nikkiso Co., Ltd. under the condition for a refractive index of 1.81.

The content of the masking agents is preferably 1 to 40%, and more preferably 2 to 20%, based on the total amount of the ink composition.

The modified polyvinylalcohol and the polyvinylalcohol having a degree of saponification of 40 to 84 mol % used in the present disclosure serve as components that can exhibit the effects of the present disclosure. Hereinafter, polyvinylalcohol may be simply abbreviated as "PVA". In the related art, a pigment contained in an ink composition is attached and fixed to a written surface, and erasability may be thus reduced. In the present disclosure, the fixing action is mitigated because the particular PVA and the modified PVA allow the pigments to aggregate loosely. This suppresses reduction in erasability of the ink for a writing board.

The used polyvinylalcohol is typically represented by $-[CH_2-CH(OH)]_m-[CH_2-CH(OCOCH_3)]_n-$. m and n each represent a number average of each of the repeating units. In the present disclosure, a PVA having a degree of saponification, $\{[m/(m+n)]\times 100\}$ from 40 to 84 mol %, preferably from 60 to 80 mol %, and particularly preferably from 70 to 80 mol %, is used.

For the degree of saponification of the PVA, a PVA having a degree of saponification of less than 40 mol % is not preferred because the ink becomes unstable. On the other hand, a PVA having a degree of saponification of greater than 84 mol % is not preferred because enhancement effect of erasability becomes insufficient.

Specifically, as the PVA that can be used, a PVA having a suitable degree of saponification in the range described above is selected from commercially available PVAs such as GOHSENOL A series, GOHSENOL G series, and GOHSENOL K series manufactured by Mitsubishi Chemical Corporation, POVAL J series manufactured by Japan VAM & POVAL Co., Ltd., and KURARAY POVAL PVA series manufactured by Kuraray Co., Ltd. The PVA having the degree of saponification described above may be used alone, or a combination of PVAs having a plurality of degrees of saponification may be used.

Furthermore, in the present disclosure, in addition to the PVA having the properties described above, a modified PVA alone or a combination of a modified PVA and the PVA having the properties described above can be used.

Examples of the modified PVA that can be used include PVAs obtained by modifying a hydroxy group and an acetyl group of each PVA to a modification group, such as a carboxylate group, sulfonate group, acetal group, or ethylene oxide group, and PVAs in which a side chain has the modification group described above. Furthermore, a PVA-acrylic acid-methyl methacrylate copolymer, obtained by copolymerizing a partially saponified PVA and acrylic acid and methyl methacrylate, can be also used as the modified PVA of the present disclosure.

From the perspective of further exhibition of the effects of the present disclosure, use of a modified PVA having the degree of saponification described above, from 40 to 84 mol %, is preferred.

Specifically, as the modified PVA that can be used, a modified PVA having suitable degree of saponification and degree of polymerization is selected from commercially available modified PVAs such as GOHSENX L series and GOHSENX WO series manufactured by Mitsubishi Chemical Corporation, anion-modified PVA, A series, manufactured by Japan VAM & POVAL Co., Ltd., and EXCEVAL 1713 manufactured by Kuraray Co., Ltd. Furthermore, as the PVA-acrylic acid-methyl methacrylate copolymer, a suitable PVA-acrylic acid-methyl methacrylate copolymer such as POVACOAT manufactured by Daido Chemical Corporation can be selected.

The modified PVA may be used alone, or a combination of the modified PVAs may be used.

The used modified PVA is effective for suppressing reduction in erasability of the ink for a writing board. A carboxylate group-modified, sulfonate group-modified, or acetal group-modified PVA is particularly preferred due to excellent stability.

The total content of the PVA and the modified PVA as described above is preferably 0.05 to 5%, and more preferably 0.1 to 3%, based on the total amount of the ink composition.

The total content of the PVA and the modified PVA less than 0.05% is not preferred because the effects of the present disclosure cannot be exhibited and erasability becomes insufficient. On the other hand, the total content of the PVA and the modified PVA greater than 5% is not preferred because ink stability becomes unstable.

The marking ink composition for a writing board of the present disclosure is prepared with, in addition to the components described above, as the balance, water such as tap water, purified water, distilled water, ion exchanged water, and pure water. In addition to the components described above, the marking ink composition for a writing board of the present disclosure can appropriately contain optional components, such as erasing auxiliaries, water soluble organic solvents, antimicrobial agents, defoamers, and thickeners in a range that does not impair the effects of the present disclosure.

The erasing auxiliary that can be used is used to further enhance erasability, or releasability, of drawn lines. The erasing auxiliary is not particularly limited as long as the erasing auxiliary is used for the marking ink composition for a writing board. For example, a monosaccharide, a disaccharide, an oligosaccharide, a reducing sugar, a non-reducing sugar, a sugar alcohol such as sorbitol, maltitol, erythritol, pentaerythritol, and trehalose, a reduced starch, a betaine derivative, and a long-chain fatty acid ester formally including a long-chain alcohol and a long-chain carboxylic acid can be used.

The content of the erasing auxiliaries is preferably 1 to 10%, and more preferably 2 to 8%, based on the total amount of the ink composition.

The content of the erasing auxiliary less than 1% is not preferred because further enhancement of erasability becomes insufficient. On the other hand, the content of the erasing auxiliary greater than 10% is not preferred because ink stability becomes unstable.

Examples of the water soluble organic solvent that can be used include solvents such as alcohols such as ethyl alcohol, n-propyl alcohol, isopropyl alcohol, n-butyl alcohol, isobutyl alcohol, and t-butyl alcohol, including modified and unmodified thereof, glycerin, ethylene glycol, diethylene glycol, hexylene glycol, 1,3-butanediol, polyethylene glycol, propylene glycol, butylene glycol, ethylene glycol monomethyl ether, ethylene glycol monoethyl ether, diethylene glycol monomethyl ether, diethylene glycol monoethyl ether, ethylene glycol monomethyl ether acetate, propylene glycol monomethyl ether, and propylene glycol monoethyl ether.

Each of the water soluble organic solvents can be used alone, or a plurality of the water soluble organic solvents can be mixed and used. The content of the water soluble organic solvent is preferably 0.1 to 20%, and more preferably 1 to 10%, based on the total amount of the ink composition.

For production of the marking ink composition for a writing board of the present disclosure, the components describe above in the scope of contents described above are mixed and pulverized by a known disperser, such as a ball mill, a roll mill, a sand mill, a flow mill, a DYNO-MILL, or an attritor. The object of marking ink composition for a writing board can be easily obtained by, as necessary, removing coarse particles and impurities from an intermediate product obtained by the agitation and mixing or mixing and pulverization, by a method such as filtration and centrifugation.

Furthermore, the marking ink composition for a writing board of the present disclosure can be suitably used for a writing tool for a writing board or the like that serves as a non-absorbing surface, such as a white board marker or a black board marker.

The reason why the marking ink composition for a writing board of the present disclosure having the configuration as described above has excellent erasability of drawn lines is presumed to be as follows.

A known marking ink composition for a writing board has problems of causing reduction in erasability due to a pigment sticking to a written surface depending on, for example, the used pigment or interaction with other blended components. Furthermore, it is often difficult to erase depending on a material or the like of a writing board and problems, in which the letters and the like remain on the writing board, occurred. In the present disclosure, the binding action is mitigated because the particular PVA and the modified PVA allow the pigments to aggregate loosely. Furthermore, regardless of the material of a writing board, reduction in erasability of the ink for a writing board can be suppressed. Thus, when wiped off with water, drawn lines are easily erased.

Furthermore, when a styrene-acrylate resin or a styrene-maleate resin is used as the pigment dispersant resin, superior color development of drawn lines is achieved.

EXAMPLES

Next, the present disclosure will be described in further detail with reference to examples and comparative examples, although the present disclosure is not limited to the following examples and the like.

Examples 1 to 6 and Comparative Examples 1 and 2

Each marking ink composition for a writing board was prepared by using the formulation shown in Table 1 below and by mixing and dispersing using a homomixer or disperser.

For each of the marking ink compositions for writing boards of Examples 1 to 6 and Comparative Examples 1 and 2 obtained as described above, color development and erasability were evaluated by the following methods.

The results are shown in Table 1 below.

<Evaluation Method of Color Development>

In a pen body of PC-5M, manufactured by Mitsubishi Pencil Co., Ltd., each of the marking ink compositions for writing boards was charged. Five spirals having a diameter of approximately 30 mm were drawn on a blackboard or a whiteboard of which material is manufactured by Plus Corporation with the size of 45×30 cm for both, at a temperature of 25° C. and a relative humidity of 65%. Then, the appearance of the drawn lines of the five spirals was observed and evaluated based on the following evaluation criteria.

Evaluation Criteria:
  A: bright color development
  B: slightly dull color development
  C: dull color development <Evaluation Method of Erasability>

In a pen body of PC-5M, manufactured by Mitsubishi Pencil Co., Ltd., each of the marking ink compositions for writing boards was charged. Five spirals having a diameter of approximately 30 mm were drawn on a blackboard or a whiteboard of which material is manufactured by Plus Corporation with the size of 45×30 cm for both, at a temperature of 25° C. and a relative humidity of 65%, and then stored for 30 minutes at a temperature of 50° C. and a relative humidity of 30%. Then, approximately 25 g of tap water was soaked into paper towel for experiment, Kim Towel™ manufactured by Nippon Paper Crecia Co., Ltd., and the board was rubbed with the paper towel while maintained at horizontal. The appearance of the drawn lines of the five spirals after the rubbing was observed and evaluated based on the following evaluation criteria.

Evaluation Criteria:

A: Erasing was achieved by rubbing once with a force of 7.84 N using weight of 0.8 kg applied from above.

B: Erasing was achieved by rubbing three times with a force of 7.84 N using weight of 0.8 kg applied from above.

C: Erasing was not achieved even by rubbing six times with a force of 7.84 N using weight of 0.8 kg applied from above.

TABLE 1

Total: 100% by mass

|  |  | Example | | | | | | Comparative Example | |
|---|---|---|---|---|---|---|---|---|---|
|  |  | 1 | 2 | 3 | 4 | 5 | 6 | 1 | 2 |
| Masking agent | | | | | | | | | |
| Aluminum pigment | WXM-7675 *1 | 10 | 10 |  | 10 | 10 | 10 | 10 |  |
| Titanium oxide | Ti-Pure™ R-900 *2 |  |  | 25 |  |  |  |  | 25 |
| Hollow resin particle | ROPAQUE™ OP-84J *3 | 10 | 10 | 10 |  | 10 | 10 | 10 | 10 |
| Pigment | | | | | | | | | |
| Pigment Red 122 | Paliogen Pink L4790 *4 | 2 | 2 | 2 | 2 | 2 | 2 | 2 | 2 |
| Pigment dispersant | | | | | | | | | |
| Styrene-acrylate | Joncryl® 63J *5 | 3 |  | 3 |  | 3 | 3 | 3 | 3 |
| Styrene-maleate | ARASTAR 700 *6 |  | 3 |  |  |  |  |  |  |
| Polyvinylpyrrolidone | K-90 |  |  |  | 3 |  |  |  |  |
| Erasing auxiliary | | | | | | | | | |
| Disaccharide | Trehalose *7 | 5 | 5 | 5 | 5 | 5 | 5 | 5 | 5 |
| Polyvinylalcohol | | | | | | | | | |
| PVA, degree of saponification: 80% | PVA 3-80 *8 | 0.3 |  |  | 0.3 |  |  |  |  |
| PVA, degree of saponification: 71% | PVA L-8 *9 |  | 0.3 |  |  |  |  |  |  |
| PVA, degree of saponification: 43% | LW-100 *10 |  |  |  | 1.5 |  |  |  |  |
| PVA, degree of saponification: 98% | PVA 3-98 *11 |  |  |  |  |  |  |  | 0.3 |
| Modified polyvinylalcohol | | | | | | | | | |
| Acetal modified | S~LEC KW~10 *12 |  |  |  |  | 0.3 |  |  |  |
| Carboxylate modified | AP-17 *13 |  |  |  |  |  | 0.3 |  |  |
| Sulfonate modified | L-3266 *14 |  |  | 0.3 |  |  |  |  |  |
| Water soluble solvent | | | | | | | | | |
| Glycerol |  |  |  |  |  |  |  |  | 3 |
| Water | | | | | | | | | |
| Distilled water |  | 69.7 | 69.4 | 53.5 | 79.7 | 69.7 | 66.7 | 69.7 | 55 |
| Evaluation | | | | | | | | | |
| Color development |  | A | A | A | B | A | A | A | A |
| Erasability |  | A | A | A | A | A | A | C | C |

Notes

*1 manufactured by Toyo Aluminium K.K.

*2 manufactured by Chemours

*3 manufactured by Dow

*4 manufactured by BASF

*5 manufactured by BASF Japan

*6 manufactured by Arakawa Chemical Industries, Ltd.

*7 manufactured by Hayashibara Co., Ltd.

*8, 9, and 11 manufactured by Kuraray Co., Ltd.

*10 and 14 manufactured by Mitsubishi Chemical Corporation

*12 manufactured by SEKISUI CHEMICAL CO., LTD., Solid content: 20%

*13 manufactured by JAPAN VAM & POVAL CO., LTD.

As apparently from the results in Table 1 above, it was confirmed that the marking ink compositions for writing boards of Examples 1 to 6 within the scope of the present invention exhibited superior erasability of drawn lines compared to erasability of Comparative Examples 1 and 2 out of scope of the present invention. Furthermore, it was confirmed that Examples 1 to 3 and 5 and 6, in which a styrene-acrylate resin or a styrene-maleate resin was used as the pigment dispersant resin, provided erasability of drawn lines and the color development of drawn lines in a compatible manner to a high degree.

The invention claimed is:

1. A marking ink composition suitable for a writing board, the composition comprising:
    a pigment;
    a pigment dispersant resin;
    a masking agent;
    a modified polyvinylalcohol or a polyvinylalcohol having a degree of saponification in a range of from 40 to 84% by molar ratio; and
    an erasing auxiliary,
    wherein the erasing auxiliary is selected from the group consisting of a monosaccharide, a disaccharide, an oligosaccharide, a reducing sugar, a non-reducing sugar, a sugar alcohol, a reduced starch, a betaine derivative, and a long-chain fatty acid ester.

2. The composition of claim 1, wherein the pigment dispersant resin is at least one selected from the group consisting of styrene-acrylate resins and styrene-maleate resins.

3. The composition of claim 1, wherein the erasing auxiliary is a disaccharide.

4. The composition of claim 1, wherein the modified polyvinylalcohol is a polyvinylalcohol modified with a modification group consisting of a carboxylate group, a sulfonate group, an acetal group, and an ethylene oxide group, and
    wherein the masking agent is not the pigment.

5. The composition of claim 1, comprising, based on total composition mass:
    the pigment in a range of from 1 to 10 mass %;
    the dispersant resin in a range of from 0.2 to 10 mass % in terms of solids;
    the masking agent in a range of from 1 to 40 mass %;
    the modified polyvinylalcohol or the polyvinylalcohol in a range of from 0.05 to 5 mass %; and
    the erasing auxiliary in a range of from 1 to 10 mass %.

6. The composition of claim 1, comprising, based on total composition mass:
    the pigment in a range of from 2 to 8 mass %;
    the dispersant resin in a range of from 0.3 to 4 mass % in terms of solids;
    the masking agent in a range of from 2 to 20 mass %;
    the modified polyvinylalcohol or the polyvinylalcohol in a range of from 0.1 to 3 mass %; and
    the erasing auxiliary in a range of from 2 to 8 mass %.

7. The composition of claim 1, comprising the polyvinylalcohol.

8. The composition of claim 1, comprising the modified polyvinylalcohol.

9. The composition of claim 1, wherein the pigment dispersant resin comprises a styrene-acrylate resin.

10. The composition of claim 1, wherein the pigment dispersant resin comprises a styrene-maleate resin.

11. The composition of claim 1, wherein the degree of saponification of modified the polyvinylalcohol or polyvinylalcohol is in a range of from 43 to 80% by molar ratio.

12. The composition of claim 1, wherein the degree of saponification of modified the polyvinylalcohol or polyvinylalcohol is in a range of from 70 to 80% by molar ratio.

13. The composition of claim 1, wherein the degree of saponification of modified the polyvinylalcohol or polyvinylalcohol is in a range of from 40 to less than 70% by molar ratio.

14. The composition of claim 1, wherein the erasing auxiliary is present in a range of from 1 to 10 mass %, based on a total marking ink composition mass.

15. The composition of claim 1, wherein the masking agent is particles exhibiting masking properties.

16. The composition of claim 1, wherein the masking agent comprises an aluminum pigment, titanium oxide, zinc oxide, hollow resin particle, and/or anisotropic resin particle.

17. The composition of claim 1, wherein the masking agent is particles exhibiting masking properties, and
    wherein particle surfaces of the particles are surface-treated with organic titanate.

18. The composition of claim 1, wherein the masking agent comprises titanium oxide alone or is a combination of titanium oxide, hollow resin particles, and anisotropic resin particles.

19. The composition of claim 1, wherein the masking agent is particles exhibiting masking properties, and
    wherein the particles have an average particle size in a range of from 0.05 to 20 µm.

20. The composition of claim 1, wherein the masking agent is particles comprising titanium oxide or aluminum pigment, and
    wherein the titanium oxide particles have an average particle size in a range of from 0.1 to 10 µm.

* * * * *